March 27, 1934.  R. W. GRACE  1,952,372
SPRING CONTACT
Filed June 3, 1932
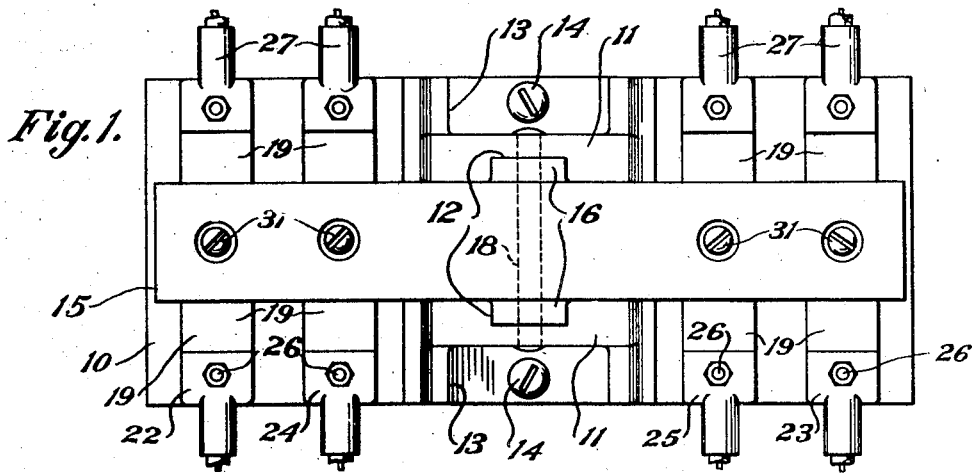
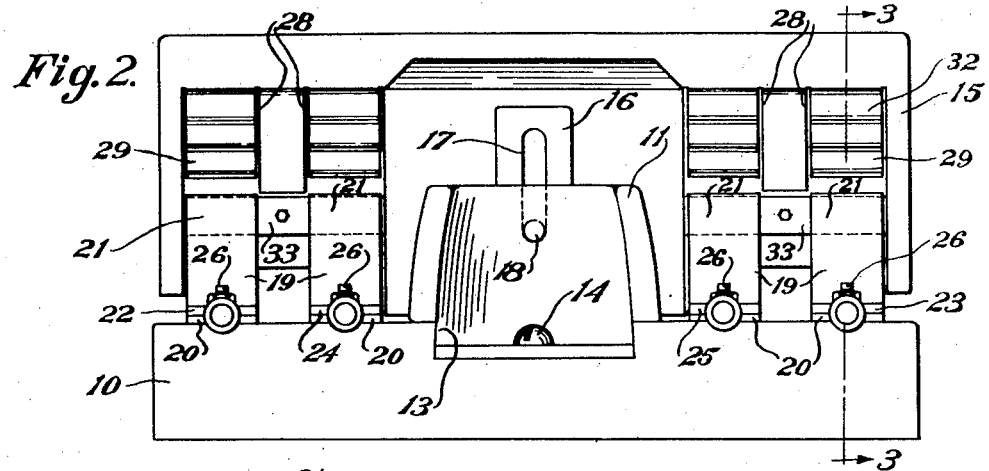
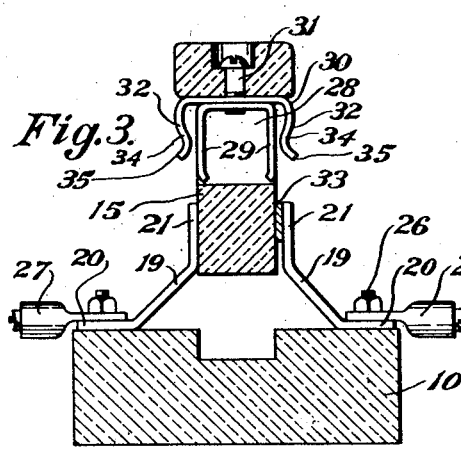
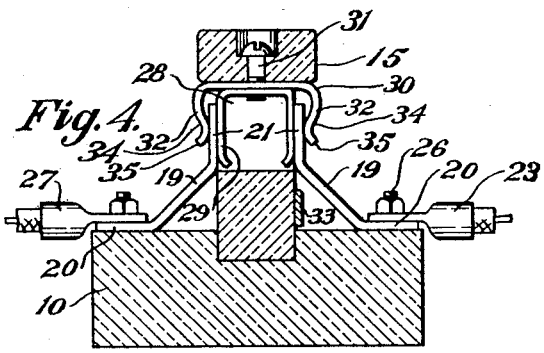
Inventor
Richard W. Grace
By Frease and Bishop
Attorneys Patented Mar. 27, 1934

1,952,372

UNITED STATES PATENT OFFICE 1,952,372

SPRING CONTACT

Richard W. Grace, Canton, Ohio, assignor to The Superior Switchboard & Devices Company, Canton, Ohio, a corporation of Ohio Application June 3, 1932, Serial No. 615,174

4 Claims. (Cl. 200—166)

The invention relates to spring contacts for electric switches and the like and more particularly to such a contact having two spring members adapted to frictionally engage opposite sides of a clip or the like.

The object of the improvement is to provide a spring contact especially adapted for use in meter testing switches or cut-outs where it is desirable to provide a spring contact which may be easily and readily engaged with or disengaged from a clip and which will assure a good electric contact with the clip when engaged therewith.

A further object is to provide a contact having two separable spring members between which a clip or the like is adapted to be inserted and frictionally engaged.

A still further object of the improvement is to provide a spring contact comprising two substantially U-shaped spring members located one within the other and forming two spaced pairs of separable spring members, each of which is adapted to receive and frictionally engage a clip or the like.

The above and other objects may be attained by constructing the invention in the manner illustrated in the accompanying drawing, in which Figure 1 is a top plan view of a meter testing switch or cut-out provided with the improved spring contacts to which the invention pertains;

Fig. 2, a side elevation of the meter testing switch illustrated in Fig. 1, showing the same in the open or meter testing position;

Fig. 3, a transverse sectional view taken as on the line 3—3, Fig. 2; and

Fig. 4, a similar view showing the meter testing switch in the closed or normal position.

Similar numerals refer to similar parts throughout the drawing.

The invention is illustrated as applied to a meter testing switch or cut-out which may include the base 10 of porcelain or other suitable insulation material provided at its central portion with the spaced upright guide members 11 having the vertical guide grooves 12 therein. The base may be recessed as at 13 to receive screws or the like as indicated at 14, for the purpose of attaching the base to any suitable support.

A movable member 15, also formed of porcelain or other insulation material is associated with the base 10 and provided at its central portion with the vertical ribs 16 slidably received in the guide grooves 12 formed in the guide members of the base.

The movable member 15 is vertically slotted at its center as shown at 17 and receives the transversely disposed horizontal pin 18 located through the guide members 11 of the base for limiting the vertical movement of the movable member in both directions.

The base 10 may be provided upon each side with four spaced angular clips indicated generally at 19, each clip having a substantially horizontal portion 20 for attachment to the base and a substantially vertical flat portion 21 normally engaging the adjacent side of the movable porcelain member 15 and adapted, as illustrated in Fig. 4, to be engaged by the improved spring contact to be later described.

The line terminals 22 and 23 and the load terminals 24 and 25 are connected to the clips 19 upon one side of the base, by means of the bolts 26 which attach both clip and terminal to the base, and the meter terminals 27 are connected in a similar manner to each of the four clips 19 upon the opposite side of the base.

As best shown in Fig. 1, each of the line and load terminals is in alinement with one of the meter terminals, and a rectangular opening 28 is formed entirely through the movable porcelain member 15 in alinement with each pair of terminals.

Within each of these openings is located one of the improved spring contacts to which the invention pertains, each of said spring contacts comprising the inner inverted substantially U-shaped spring member 29, having legs curved inwardly at their ends and flat throughout the remainder of their lengths, and the outer inverted substantially U-shaped member 30. These U-shaped spring members are preferably one-piece and are connected to the movable porcelain member as by the screws 31.

Each of the inner U-shaped members 29 is adapted to be received between the upright portions 21 of the corresponding pair of clips 19 with the flat portions of its legs frictionally engaging the flat portions 21, and the depending curved arms 32 of each outer U-shaped member are adapted to frictionally engage the outer surfaces of said clips, as best shown in Fig. 4.

It will be seen by reference to Fig. 3 that the inner and outer U-shaped members are so spaced that they will frictionally engage both surfaces of the clips 19 when the movable member is in the normal or closed position.

A pair of horizontally disposed short-circuiting bars 33 may be mounted upon one side of the movable porcelain member 15 for engagement with the vertical portions 21 of the clips 19 in order to electrically connect each load terminal with the corresponding line terminal when the movable porcelain member is raised to the open or cut-out position, as shown in Figs. 2 and 3.

From the above it will be seen that an improved spring contact is provided which may be easily and readily engaged with or disengaged from a clip or the like and which assures a good electric contact with the clip when engaged therewith as the spring contact frictionally engages opposite surfaces of the clip and clamps the same therebetween.

As best shown in Figs. 3 and 4, the legs 32 of the outer U-shaped member 30 are curved or inclined inward, toward the legs of the inner U-shaped member 29, at a point adjacent to their ends, as shown at 34, and are then inclined or curved outward at their extreme ends as shown at 35, in order that the vertical portions 21 of the clips may be more easily inserted between the legs of the inner and outer U-shaped members, as well as to provide a spring tension upon said legs so as to frictionally clamp the clips between the legs of the inner and outer members.

I claim:

1. An electric contact comprising a pair of substantially U-shape, spring contact members located one within the other, and a clip adapted to be frictionally received between each pair of legs of the spring contact members, the legs of the outer U-shape member being inclined toward the legs of the inner U-shape member adjacent their ends and then inclined outward at their end portions.

2. An electric contact comprising a pair of substantially U-shape, one-piece spring contact members located one within the other, and a clip adapted to be frictionally received between each pair of legs of the spring contact members, the legs of the outer U-shape member being curved toward the legs of the inner U-shape member adjacent their ends.

3. An electric contact comprising a pair of substantially U-shape, spring contact members located one within the other, and a clip adapted to be frictionally received between each pair of legs of the spring contact members, the legs of the outer U-shape member being curved toward the legs of the inner U-shape member adjacent their ends, and then curved outward at their end portions.

4. An electric contact comprising a pair of substantially U-shape, spring contact members located one within the other, and a clip adapted to be frictionally received between each pair of legs of the spring contact members, the legs of the inner U-shape member being curved inwardly at their ends and flat throughout the remainder of their lengths, the clip having flat portions for frictionally engaging the flat portions of the inner U-shape member, and the legs of the outer U-shape member being curved inwardly adjacent their ends and then curved outwardly at their ends.

RICHARD W. GRACE.